Jan. 18, 1966 R. AMBROSE 3,229,741
EXTENSIBLE SHOPPING BAG
Filed Aug. 14, 1964 2 Sheets-Sheet 1
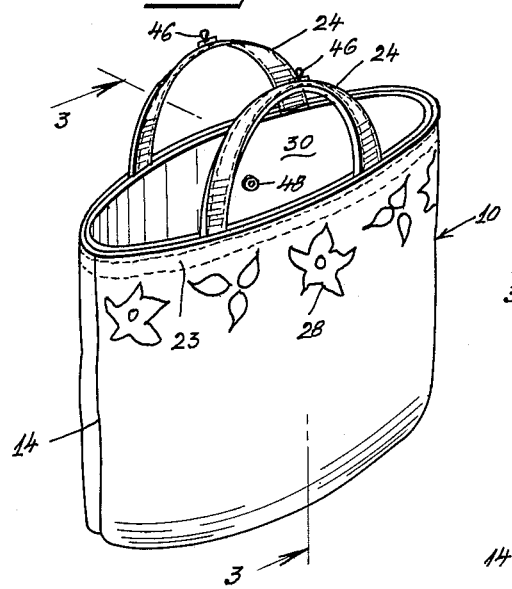
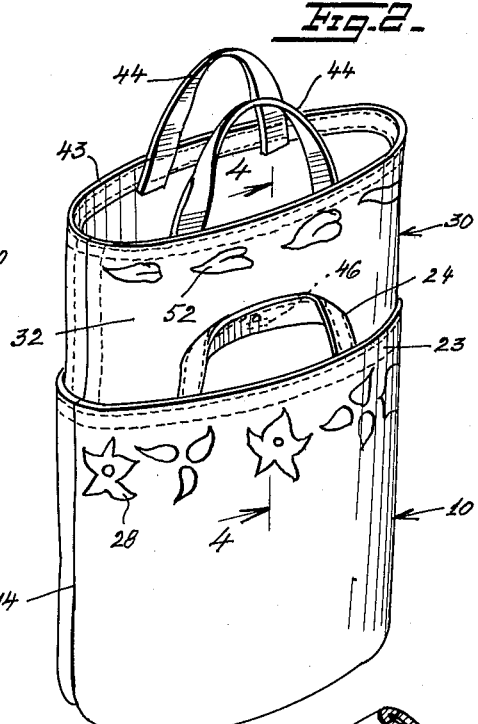
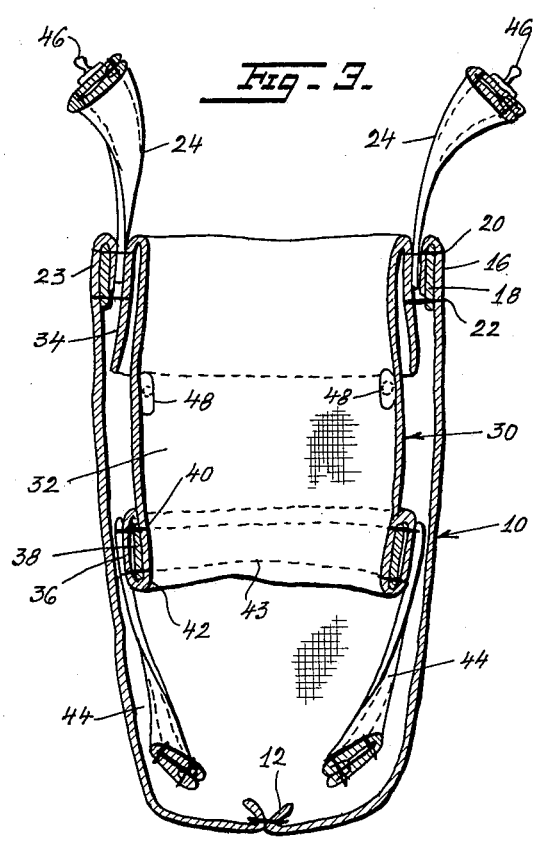
INVENTOR.
Rita Ambrose
BY Placek & Saulsbury
ATTORNEYS.

Jan. 18, 1966  R. AMBROSE  3,229,741
EXTENSIBLE SHOPPING BAG
Filed Aug. 14, 1964  2 Sheets-Sheet 2
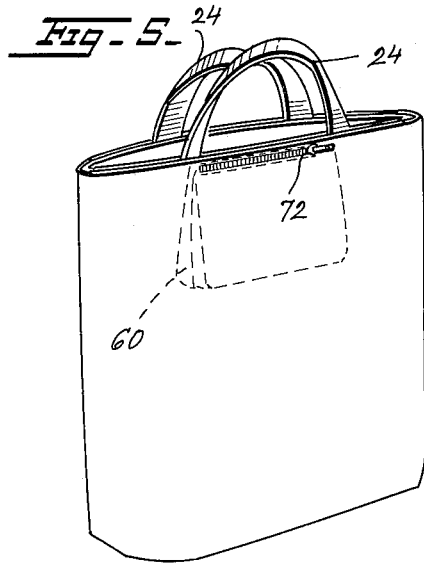
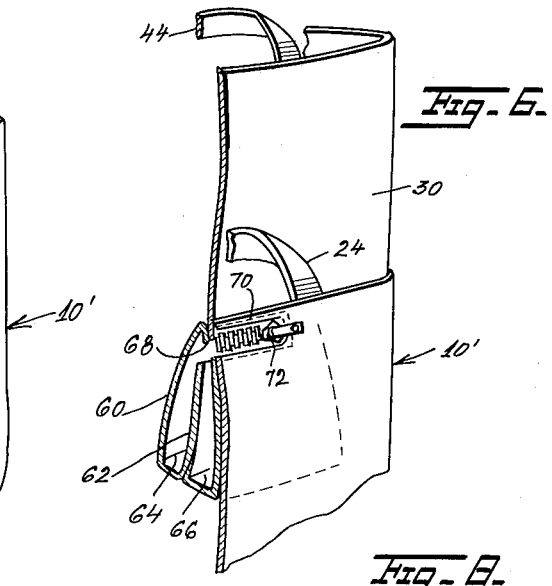
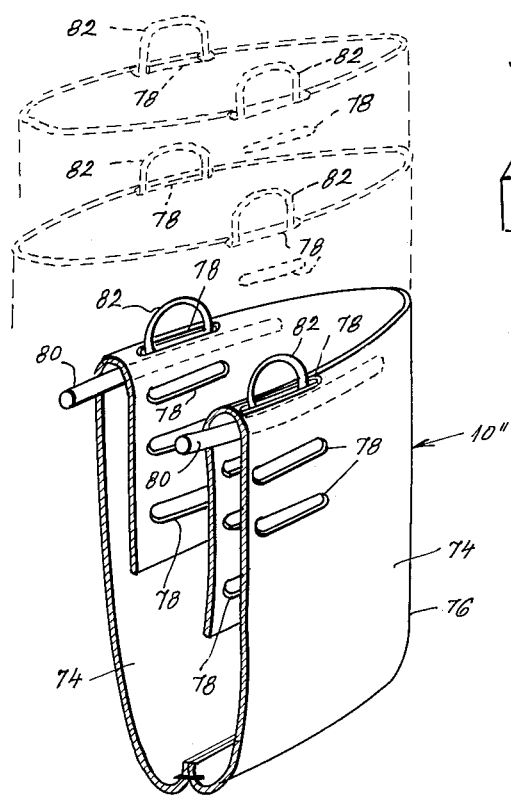
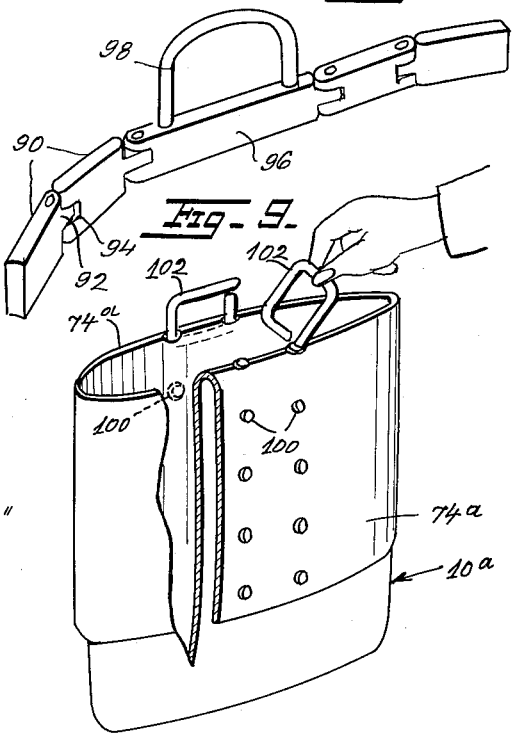
INVENTOR.
Rita Ambrose
BY Polachek & Saulsbury
ATTORNEYS.

United States Patent Office 3,229,741
Patented Jan. 18, 1966

3,229,741
EXTENSIBLE SHOPPING BAG
Rita Ambrose, Brooklyn, N.Y., assignor of one-half to Anton Campen, Woodside, N.Y.
Filed Aug. 14, 1964, Ser. No. 389,719
1 Claim. (Cl. 150—1.7)

This invention relates to new and useful improvements in shopping bags and more particularly to an extensible shopping bag.

A principal object of the present invention is to provide a shopping bag which may be used for different capacities.

Another object of the invention is to provide a shopping bag having an extensible body with separate handles for the body when in normal and extended positions.

Yet another object of the invention is to provide a shopping bag with a flexible body having a flexible extension for the body tucked inside the body.

A further object of the invention is to provide a shopping bag with a flexible body with handles therefor and having a flexible extension for the body tucked inside the body with separate handles for the extension.

A still further object is to provide an extensible shopping bag that is neat, compact and durable in use, which shall be easy to manipulate, relatively inexpensive to manufacture and yet practical and efficient to a high degree in use.

For further comprehension of the invention, and of the objects and advantages thereof, reference will be had to the following description and accompanying drawings and to the appended claim in which the various novel features of the invention are more particularly set forth.

In the accompanying drawings forming a material part of this disclosure:

FIG. 1 is a front perspective view of a shopping bag embodying one form of the invention.

FIG. 2 is a similar view of the bag of FIG. 1 in extended position.

FIG. 3 is an enlarged vertical sectional view taken on the line 3—3 of FIG. 1.

FIG. 4 is an enlarged vertical sectional view taken on the line 4—4 of FIG. 2.

FIG. 5 is a view similar to FIG. 1 of a shopping bag embodying a modified form of the invention.

FIG. 6 is a fragmentary sectional view similar to FIG. 4 of the bag of FIG. 5 in extended position.

FIG. 7 is a vertical sectional view through a shopping bag embodying a further modified form of the invention, the bag being shown in extended positions in dash lines.

FIG. 8 is a front perspective view of a modified form of handle mounting means.

FIG. 9 is a view similar to FIG. 1 of a shopping bag embodying a still further modified form of the invention, parts being shown broken away, and a handle being shown preparatory to mounting.

Referring now in detail to the various views of the drawings, in FIG. 1 a shopping bag embodying one form of the invention is illustrated and designated generally at 10. The bag 10 is made of flexible sheet material, such as heavy paper, fabric, or other suitable material and is oval in plan, with a seam 12 along the center of the bottom of the body and continued at 14 along one end. At its upper end, the material of the body is turned over upon itself forming a loop 16 and inserted in said loop there is a strip 18 of material stitched to the material of the body along the lines 20 and 22. The body is thus provided with a reinforced hem 23 at the top end edge.

At the top of the body on both sides thereof and centrally thereof, there are inverted U-shaped or looped handles 24, 24 formed of the same material as the body of the bag and fastened at the ends thereof to the body of the bag by the line of stitching 20. The handles extend above the top edge of the top of the bag body as seen in FIG. 1. The outer surface of the body of the bag may be ornamented as indicated at 28 to enhance the attractiveness of the bag.

In accordance with the invention, the body of the bag is provided with an extension 30 formed of the same material as the body of the bag. The extension 30 comprises a tubular body 32 turned upon itself at one end, the top or outer end as viewed in FIG. 3, to form an outer flange 34 which is secured to the inside of the top of the bag body by the lines of stitching 20 and 22. The body 32 is also turned upon itself at its other or inner end forming an outer flange 36, the free edge of the flange being inturned. A reinforcing flexible strip 38 is interposed between the flange and the body 32 and the flange and strip are secured in place by lines of stitching 40 and 42, thereby forming a hem 43.

A pair of U-shaped or loop-shaped handles 44, 44, formed of the same material as the extension body 32, is secured to the flange 36 by the lines of stitching 40 and 42.

The handles 24, 24 on the main body of the bag are provided with male snap fastener elements 46 adapted to snap into complementary female snap fastener elements 48 on the inner surface of the body of the extension 30.

In use, the extension 30 is normally tucked inside the body of the bag so as to use the bag for single capacity, in which event the bag is open at the top, the extension 30 serving as a lining.

When it is desired to double the capacity of the bag, the extension 30 is shifted from the inside of the body of the bag to the outside thereof as shown in FIG. 2, by turning the body of the extension inside out, whereupon the body of the extension forms an extension of the body of the bag with the handles 44 on the extension extending upwardly above the top end edge thereof. The handles 24, 24 of the main body of the bag are fastened to the sides of the body 32 of the extension 30 by the snap fastener elements 46 and 48. The bag is still open at the top and is adapted to receive approximately twice its normal capacity. The outer surface of the extension may be ornamented as indicated at 52. The extension 30 may be readily returned to normal position inside the main body of the bag.

In FIGS. 5 and 6, a shopping bag 10' embodying a modified form of the invention is illustrated. The bag 10' differs from bag 10 merely in providing an additional pocket 60 inside the body of the bag adjacent its top open end. The pocket is formed of the same material as the body of the bag and is provided with a central partition wall 62, dividing the interior of the pocket into two compartments 64 and 66, the compartments being open at the top and communicating with an opening 68 in the main body of the bag. The pocket is secured inside the body of the bag by a line of stitching 70. The opening 68 in the body of the bag is effectively closed by a slide fastener 72.

Referring now to the modified form of shopping bag 10" shown in FIG. 7, herein the side walls 74, 74 of the body 76 of the bag 10" are formed with a series of spaced closed slots centrally threeof in vertical alignment from a point midway the ends of the walls to the top ends thereof. The upper free ends of the side walls are tucked inside the body of the bag with one of the slots 78 on each side constituting part of the top edge of the open top of the bag. The depth and capacity of the body of the bag are controlled by the distance the top free ends are tucked inside the body.

A handle unit is provided on each side of the body for carrying the bag. This unit includes an elongated round rod 80 of rigid material curved to conform to the curvature of the top open end edge of the body. An inverted U-shaped or loop-shaped rigid member 82 is secured to the rod midway its ends and projects radially therefrom.

In assembling, the handle units are inserted below the tucked-in portions of the side walls and disposed between said portions and the side walls and are then pressed upwardly therebetween with the handle portions 82 in line with the slots 78 whereupon the handle portions 82 pass outwardly through the slots 78 constituting part of the top edge of the body of the bag as shown in FIG. 7, the protruding handle portions 82 serving to carry the bag.

In FIG. 7, in dash lines the handle portions 82 are shown protruding through various slots 78 positioned closer to the free end of the side walls thereby increasing the length of the body of the bag and increasing the capacity of the bag accordingly.

In FIG. 8, a modified form of handle unit for use with the bag 10″ of FIG. 7 is shown. The handle unit consists of an articulated body in the form of a chain of solid plate links 90 connected to each other by stud 92 and groove 94 assemblies, the central link 96 being longer and supporting an inverted or loop-shaped handle element 98 adapted to extend through one of the slots 78 of the bag 10″ of FIG. 7. The articulated body assumes the same position as the rod 80 of FIG. 7 and is assembled in the same manner.

The modified form of shopping bag 10a shown in FIG. 9 is somewhat similar to the bag 10″ except that the free ends of the side walls 74a, 74a are folded over the outside of the side walls instead of being tucked inside as in bag 10″. Furthermore, in place of the slots 78 of bag 10″, the side walls 74a, 74a are formed with pairs of spaced holes 100, 100 in vertically aligned relation. For use with the holes 100, 100, rectangular-shaped round wire handles 102, 102 are provided, the free ends of the wires being closely spaced so as to permit threading of the handle through the holes of a pair of holes and to interlock the handle with such holes, with the handle projecting outwardly as shown in FIG. 9. The length and capacity of the bag 10a are adjusted similarly to the adjustment of bag 10″.

While I have illustrated and described the preferred embodiments of my invention, it is to be understood that I do not limit myself to the precise constructions herein disclosed and that various changes and modifications may be made within the scope of the invention as defined in the appended claim.

Having thus described my invention, what I claim as new, and desire to secure by United States Letters Patent is:

A shopping bag comprising a hollow flexible body with opposed side and end walls, a closed bottom wall and being open at the top, the top edge of the body being turned inwardly upon itself forming a flange, a reinforcing strip interposed between the flange and body, lines of stitching securing the flange and strip to the body forming a hem, a pair of flexible handles projecting from the top of the hem, a flexible tubular body inside the hollow flexible body, one end of said tubular body being turned upon itself forming a flange, said flange being attached to the hem on the top of the hollow body, the other end of the tubular body being turned upon itself forming a flange, said other end being unattached, a reinforcing strip interposed between said latter flange and the tubular body, lines of stitching securing said flange and latter reinforcing strip in place and forming a hem on said other end of the tubular body, a pair of flexible handles secured to the latter hem at opposite sides of the tubular body in line with the handles on the hollow body, said tubular body being extensible and adapted to form an extension of the open top end of the hollow body, the handles on said tubular body adapted to form an extension of said tubular body in extended condition for carrying the bag.

References Cited by the Examiner

UNITED STATES PATENTS

| | | | |
|---|---|---|---|
| 1,207,533 | 12/1916 | Gamble | 150—49 |
| 1,730,603 | 10/1929 | Carlson | 150—1.7 |
| 1,810,347 | 6/1931 | Daitch | 150—1.7 |
| 2,212,390 | 8/1940 | Conklin | 150—1.7 |
| 2,325,853 | 8/1943 | Harlem | 150—1.7 |
| 2,454,013 | 11/1948 | Scherzinger | 150—1.7 |
| 2,871,900 | 2/1959 | Auditore | 150—1.7 |

FOREIGN PATENTS 1,182,600   1/1959   France.

JOSEPH R. LECLAIR, *Primary Examiner.*

GEORGE O. RALSTON, *Examiner.*

V. A. TOMPSON, D. T. MOORHEAD,
*Assistant Examiners.*